United States Patent [19]

Wise

[11] 4,092,530

[45] May 30, 1978

[54] FEEDBACK LOOP CONTROL SYSTEM EMPLOYING METHOD AND APPARATUS FOR STABILIZING TOTAL LOOP GAIN AND BANDWIDTH

[75] Inventor: William L. Wise, Mountain View, Calif.

[73] Assignee: Coherent, Inc., Palo Alto, Calif.

[21] Appl. No.: 701,856

[22] Filed: Jul. 1, 1976

[51] Int. Cl.² .............................................. G01J 1/32
[52] U.S. Cl. ............................... 250/205; 324/83 FE; 331/94.5 S
[58] Field of Search .................. 331/1 R, 3, 9, 94.5 S; 250/205, 214 C; 324/83 FE; 330/59

[56] References Cited

U.S. PATENT DOCUMENTS

| | | | |
|---|---|---|---|
| 2,933,696 | 4/1960 | Reder et al. | 324/83 FE |
| 3,199,037 | 8/1965 | Graves | 324/83 FE |
| 3,201,702 | 8/1965 | Hanulec et al. | 324/83 FE |
| 3,395,365 | 7/1968 | Fork | 331/94.5 S |
| 3,543,181 | 11/1970 | Lee et al. | 331/94.5 S |
| 3,729,261 | 4/1973 | Sandercock | 331/94.5 S |
| 3,734,623 | 5/1973 | Wolber | 331/94.5 S |

*Primary Examiner*—David C. Nelms
*Assistant Examiner*—Michael J. Tokar
*Attorney, Agent, or Firm*—Limbach, Limbach & Sutton

[57] ABSTRACT

A feedback loop control system is disclosed for controlling an element which has variable gain and which includes means for stabilizing the total loop gain and bandwidth of the control loop despite variations in the gain of the controlled element.

11 Claims, 5 Drawing Figures

FEEDBACK LOOP CONTROL SYSTEM EMPLOYING METHOD AND APPARATUS FOR STABILIZING TOTAL LOOP GAIN AND BANDWIDTH

BACKGROUND OF THE INVENTION

This invention relates to feedback loop control systems. More particularly, it relates to feedback loop control systems for controlling elements which have a variable gain and which produce an output signal proportional to the element gain.

In most feedback loop control systems, the basic problem to be solved is simply that of generating and feeding back an error correction signal whose parameters are essentially independent of any effects of gain by the element to be controlled. In such a situation the gain to be applied to the error correction signal remains at all times substantially constant, regardless of the output of the controlled element, since the controlled element has no impact upon the bandwidth of the feedback control loop. Conversely, in a conventional automatic gain control circuit the problem addressed is that of amplifying or attenuating a signal utilized in an open loop control system. In that situation the applied gain is utilized for stabilization of another parameter of operation of the controlled element which does not itself affect the applied gain. Heretofore, it has not been necessary to address the compounded problem of a second order stabilization in which it is necessary to stabilize the loop gain of the system stabilizing feedback loop, in which the controlled element itself causes variations in the loop gain and in which the operating parameters of the controlled element thus affect the bandwidth of the feedback control system. In such a compounded feedback control system it is necessary to stabilize the feedback loop gain to compensate for variations in the gain of the controlled element in order to suppress noise and stabilize the operating parameter of interest, such as output frequency or output signal level.

One such variable gain element for which feedback control is desirable is a laser, whose gain and thus light output intensity is directly related to the current input thereto. Since the gain of a laser thus varies with light output, the bandwidth of any conventional feedback loop control system used with the laser would also vary with the intensity of light output, due to the impact on loop gain caused by the variable gain of the laser. Thus, in the use of a conventional feedback control system with a laser having a modulated output intensity, the increased noise at lower output levels would render it increasingly difficult for the laser to follow accurately the intensity modulation commanded by the control loop. Similarly, the use of conventional feedback control loop with a variable frequency laser, such as a dye laser, would render it difficult to control and maintain accurately the frequency of the laser output whenever the intensity of the laser drops, reducing the bandwidth of the output signal. Further, stabilization of the output intensity variation in a pump laser used to pump such a dye laser would encounter similar difficulties where the variably noisy output signal is compared against a reference signal having little or no noise.

To illustrate the stabilization problem more specifically, the case of the tunable broadband dye laser is instructive, since it is capable of providing output radiation at wavelengths ranging over a comparatively large segment of the visible spectrum but experiences substantial gain variations when significant changes are made in its output wavelength.

With the development of this dye laser having the ability to vary its output frequency a new dimension in precision spectroscopy was provided, allowing illuminating subjects of interest with the output radiation from such a laser at any of a broad range of output frequencies. For such purposes it is often necessary that the output radiation of the laser be confined to a very narrow range of frequencies and that such output be stabilized to maintain the output frequency substantially constant over a relatively long time period of several minutes or even hours or more. Tuning of such a laser system conveniently may be achieved by a variable optical frequency discriminator such as a high finesse optical cavity receiving a portion of the laser output radiation and forming a part of a servo loop controlling one or more frequency adjusting element within the laser cavity. One approach to this control method is described in a co-pending patent application to Berg and Wise, entitled "Method and Apparatus for Providing a Calibrated Scan for a Scanning Laser," which is assigned to the assignee of this application. The frequency stabilization technique used with such apparatus is that of frequency offset locking using the side of a transmission fringe of the optical frequency discriminator or reference cavity, with the zero for the error signal located approximately half-way up the fringe. This technique is described in "Frequency Stabilization of a CW Dye Laser" by Barger, Soren and Hall, 22 Applied Physics Letters No. 11, pp. 573–75 (1973). With such an approach, using a fast differencing technique employing a separate laser output intensity reference channel, a frequency error signal may be obtained whose variations are substantially independent of the minor fluctuations in laser output intensity in the spectral region of choice. However, although the frequency error signal variations are substantially independent of laser intensity fluctuations on a proportional basis, the absolute magnitude of such signals inherently varies with the output intensity, thus requiring an offsetting adjustment in some frequency stabilization apparatus for major changes in level of the laser output radiation intensity, such as occur when the spectral range of operation of the laser is changed significantly. In prior art laser systems such adjustments are generally made by manual adjustment of a potentiometer.

While such a manual adjustment technique is quite suitable for a tunable broadband laser system in which the spectral region of interest is infrequently changed, the necessity for checking and manually resetting the feedback loop gain applied to the frequency error signal is most inconvenient and disadvantageous in a laser system which may quickly be tuned over a very broad spectral range, such as the 400 nanometer (nm) to 800 nanometer (nm) range of a tunable dye laser. When tuning over such a broad range, the gain of the laser, which is part of overall loop gain, may vary dramatically, even as much as 100:1. Additionally, conventional automatic gain control (AGC) techniques in which the output signal of a circuit, in this case the frequency error signal, is maintained at a generally constant level are inapplicable to this problem. This is so because the signal of interest is an error feedback signal which is ultimately driven to zero instead of the conventional constant level output signal, so that attempted maintenance of this error feedback signal at a constant level as the frequency error is driven to zero would result in the command of feedback loop again to increase, approaching infinity, quickly leading to undesired oscillation.

SUMMARY OF THE INVENTION

In view of the above, it is an object of the present invention to provide a method and apparatus for automatically stabilizing the total loop gain of a feedback loop control system which controls an element having variable gain and producing an output signal proportional to the element gain, thus to achieve the "second-order" stabilization of loop gain and bandwidth necessary to obtain automatic stabilization of other operating parameters of the controlled element.

In accordance with the present invention, a feedback loop control system is disclosed for controlling an element which has a variable gain and which produces an output signal proportional to the element gain. This system includes means for generating a feedback signal corresponding to the difference between a desired value of an element operating parameter and the actual value of the operating parameter in the element output signal, and means for compensating the feedback signal for variations in the controlled element gain by applying to the feedback signal a compensating signal which varies inversely with the controlled element gain variations. By means of this method and apparatus the total loop gain and bandwidth of the element control loop may be stabilized despite variations in the gain of the controlled element.

DESCRIPTION OF PREFERRED EMBODIMENTS

Figure 1:
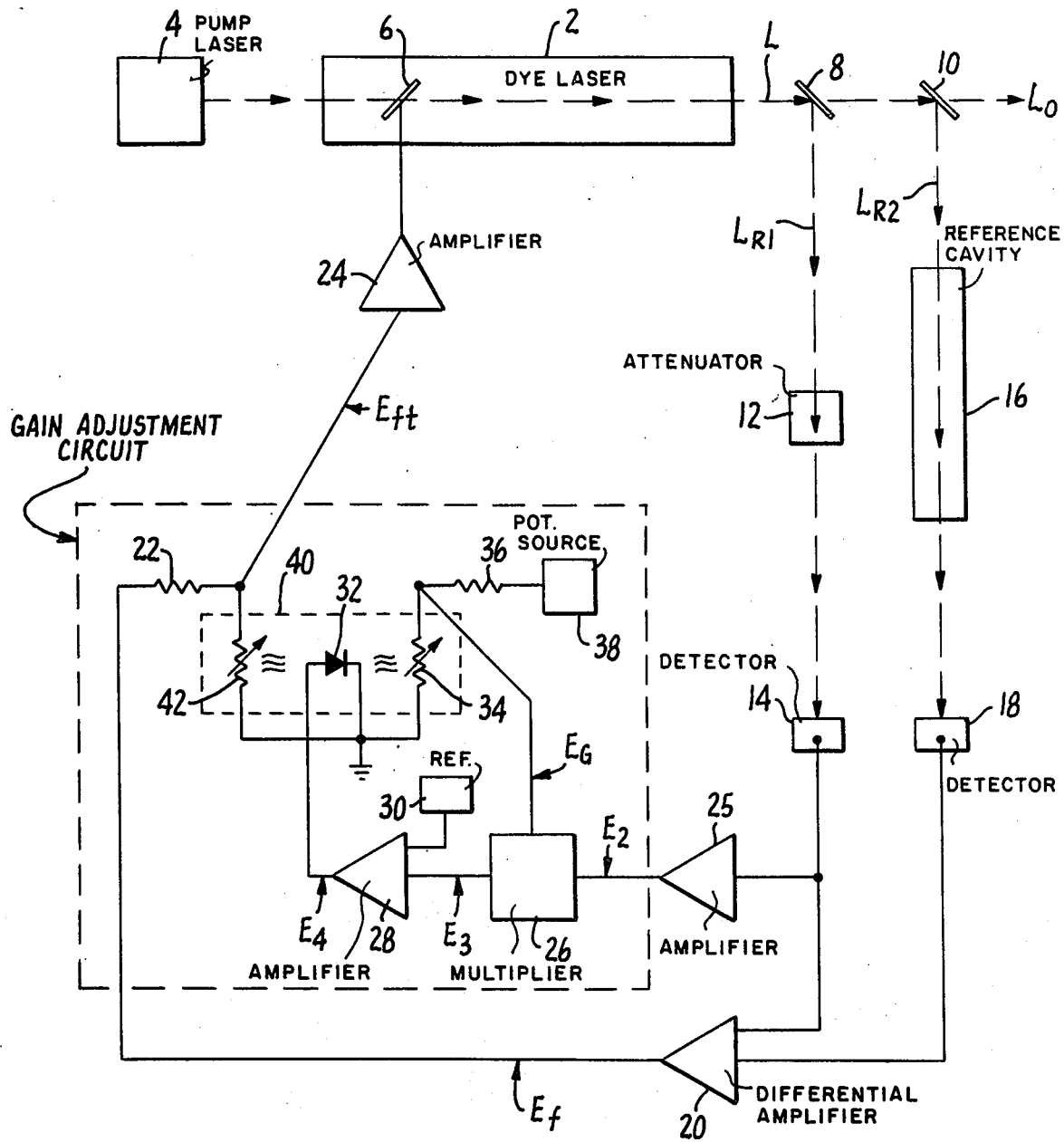
FIG. 1 is a functional block diagram in simplified schematic form of a dye laser system incorporating the feedback loop control system of this invention in a frequency stabilizing application.

One embodiment of the feedback loop control system of this invention involves a broadband tunable dye laser system in which the invention is used in conjunction with an automatic frequency control arrangement, as illustrated schematically in the simplified block diagram of FIG. 1.

The dye laser 2 of this embodiment conveniently may be of the type disclosed in U.S. Pat. No. 3,873,941 to Yarborough et al, and more specifically, may be of the type disclosed in the co-pending application to Berg and Wise referenced above. In a conventional manner, this dye laser 2 is pumped by a laser beam from a pumping laser 4, which conveniently may be an intensity-stabilized, continuous wave argon laser, to provide a dye laser output beam L. Within the laser cavity is provided at least one variable frequency control element 6 for tuning the output frequency of the laser 2. While, for purposes of the schematic illustration of this disclosure, only a single frequency varying element 6 is illustrated, it is to be understood that such element 6 may also represent a combination of elements such as adjustable etalons, adjustable cavity mirrors and an adjustable birefringent filter such as described in Yarborough et al U.S. Pat. No. 3,868,592.

The laser output beam L encounters two beam splitters 8 and 10, which may be of conventional configuration. These beam splitters 8 and 10 serve to split off portions $L_{R1}$ and $L_{R2}$, respectively, of the laser beam L for reference purposes, while passing portion $L_O$ of the beam as the system output. Reference beam $L_{R1}$, reflected off beam splitter 8, is directed through intensity attenuator 12 and then onto first radiation detector 14, which may be of the nature of a photocell. The second reference beam, $L_{R2}$, is directed into reference cavity 16, which preferably may be a high finesse Fabry-Perot cavity. As is well known, the portions of the reference beam $L_{R2}$ which comprise multiples of the resonant frequency of resonant cavity 16 constructively interfere with one another and are transmitted out of the cavity 16 as transmission fringes and may be directed onto second radiation detector 18. Since only certain frequencies of the incident radiation $L_{R2}$ are transmitted by cavity 16 onto detector 18, the electrical signal out of detector 18 may thus be seen to depend upon both the intensity of beam $L_{R2}$ and its frequency. On the other hand, beam $L_{R1}$ encounters no frequency discriminator, thus causing the signal out of detector 14 to be dependent substantially only upon the output intensity of the laser 2.

The electrical signals from detectors 14 and 18 are fed into differential amplifier 20 for creation of a feedback control signal $E_f$ for correcting any variation between desired frequency at which the resonant cavity is controlled and the actual dye laser output frequency. This feedback signal is created by the fast-differencing technique described in the paper by Barge, Sorem and Hall, referenced above. The feedback signal $E_f$ from differential amplifier 20 is then fed through loop gain-compensating attenuator (resistors 22 and 42) for purposes to be described below, and then to amplifier 24 which serves to amplify the signal to drive the dye laser frequency controlling element 6. Through this frequency controlling element 6 the feedback control signal serves to correct any error between the output frequency of the dye laser and the predetermined control frequency of the reference cavity, thus to control and stabilize the frequency of the laser output.

Figure 2A:
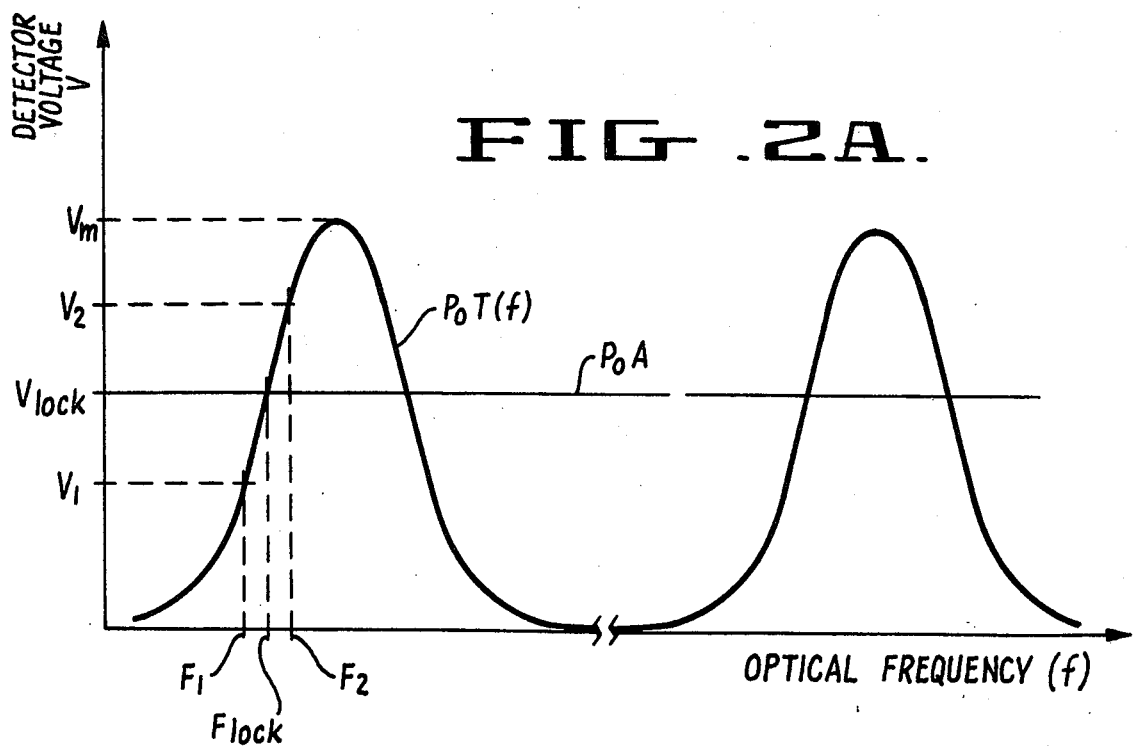
FIGS. 2(a) and 2(b) are illustrations of the frequency distribution of the output voltages of the detectors of the laser system of FIG. 1.
Figure 2B:
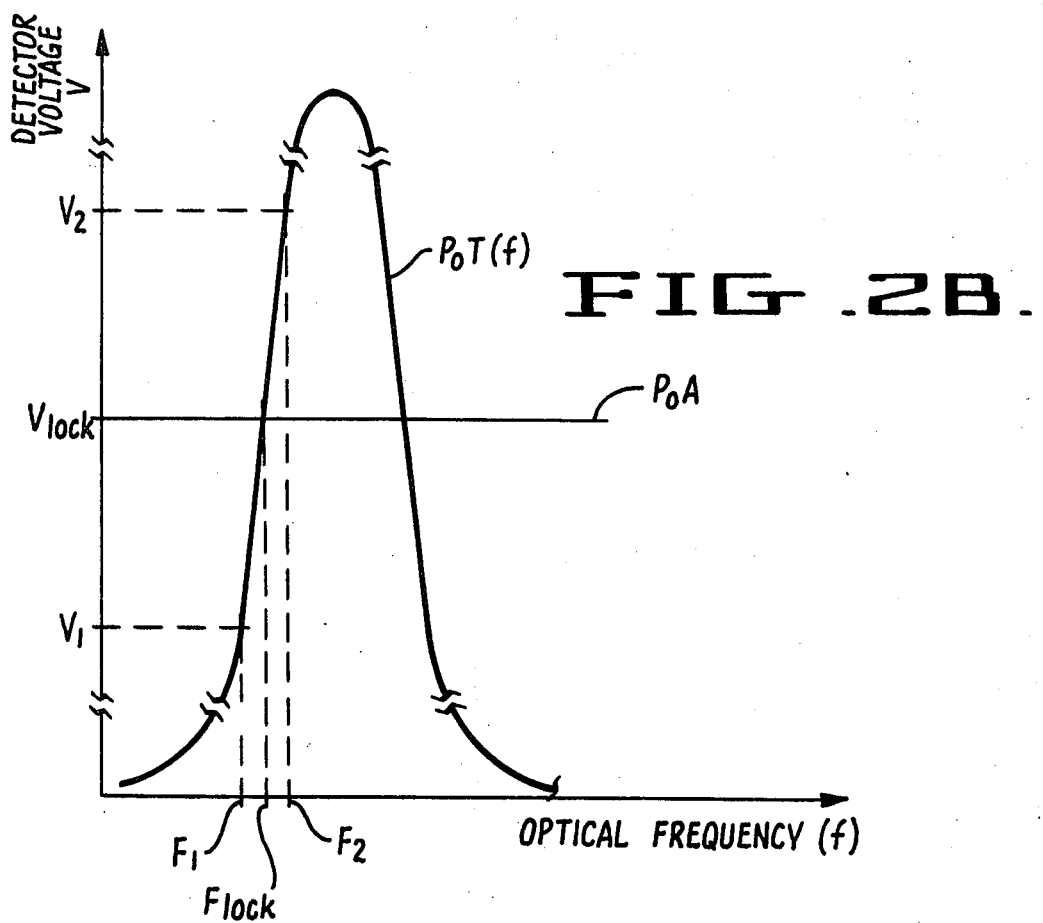

The manner of generating the necessary frequency control signal for stabilizing the output frequency of the laser may now be understood as follows: the Fabry-Perot reference cavity inherently has a transmission curve in which the proportion of incident light transmitted is a function $T(f)$ of the frequency of $(f)$ of the incident light. Such a transmission curve as illustrated in FIGS. 2a and 2b, in which detector voltage v is shown as a function of the optical frequency f of the incident radiation from the laser. The curve is defined as $P_O T(f)$ where $P_O$ represents the output power or intensity of the laser beam. The horizontal line $P_O A$ represents the output ot the detector 14, which is independent of the frequency of the laser beam and is thus constant regardless of the frequency of the incident laser beam. The level of the signal out of detector 14, $P_O A$, is thus solely dependent upon the laser beam intensity, $P_O$, and the attenuation, A, applied to the reference beam $L_{R1}$ by attenuator 12. This attenuator 12 is selected to make $P_O A$ about one-half the maximum value $V_m$ of the $P_OT(f)$ curve, as illustrated in FIG. 2a. The reference cavity 16 is also adjusted or tuned such that the desired operating frequency $F_{lock}$, at which the laser frequency control servo system is desired to be locked, also occurs about half-way up the transmission curve $T(f)$ of the reference cavity 16. Thus, when the dye laser 2 is operating at the desired frequency, $F_{lock}$, the output voltages of both detector 18 and detector 14 equal $V_{lock}$. In this situation, with identical signals from the two detectors in the differential amplifier 20, no frequency error signal is generated, as is appropriate when the dye laser is operating at the proper frequency.

If the frequency of the output radiation of laser 2 were to decrease from the desired value of $F_{lock}$ to some lower frequency $F_1$, with the laser intensity $P_o$ remaining constant, the transmission function $T(f)$ of the reference cavity would pass a correspondingly reduced amount of that radiation, thus providing a reduced voltage $V_1$ out of detector 18, as indicated in FIG. 2a. With the intensity $P_O$ of both reference beams $L_{R1}$ and $L_{R2}$ remaining constant this decrease in frequency to $F_1$ would thus present voltages $V_{lock}$ from detector 14 and $V_1$ from detector 18 to differential amplifier 20, thus resulting in a frequency feedback control signal for correcting the difference between these two detector output voltages. This feedback control signal may then be applied through resistor 22 and amplifier 24 to laser frequency control element 6 to adjust the frequency of the laser output to eliminate this error. It may be noted that any fluctuations in the laser output radiation intensity $P_O$ result in coordinated shifting upwardly or downwardly of the outputs of detectors 14 and 18, thus always maintaining the output of detector 14 at about one-half the maximum value of $P_OT(f)$. Thus, the intensity dependent signal of detector 14 will shift along with any changes in the intensity and frequency dependent signal from detector 18, making the feedback control signal essentially independent of any minor intensity changes.

In a manner analogous to the frequency decreasing condition described above, an increase in the frequency of the laser output radiation to some frequency $F_2$ will generate a positive feedback signal corresponding to the difference between voltages $V_2$ and $V_{lock}$, also as illustrated in FIG. 2a. Such a feedback signal will thus, through resistor 22 and amplifier 24, effect the proper adjustment of the laser cavity frequency control element 6 to drive such error back to zero.

Such a laser system as described above, and in the above referenced paper by Barger, Sorem and Hall, thus may be seen to apply a given drive signal to the laser frequency control element for a given difference between the voltage out of detector 18 and the voltage out of detector 14. This arrangement is highly satisfactory as long as any changes in the laser output radiation intensity $P_O$ are relatively minor. However, as illustrated in FIG. 2b, significant changes in the output intensity $P_O$ of the laser, such as occur when going from one spectral range to another, may effect dramatic changes in the slope of the $P_OT(f)$ curve in the areas of interest. This slope (and therefore gain) change occurs as a result of the reference cavity transmission function $T(f)$ providing for the same proportional transmission of incident radiation as a function of frequency while the level or intensity $P_O$ of that incident radiation is changed (increased in FIG. 2b). Thus, for the same laser radiation frequency excursions (F1 − $F_{lock}$ and F2 − $F_{lock}$) the voltage differences (V1 − $V_{lock}$ and V2 − $V_{lock}$) in the case of FIG. 2b will be substantially different from those of the case of FIG. 2a, thus causing substantially different (greater) error signals to be generated by differential amplifier 20, in the case of FIG. 2b. Since the frequency error is the same in both situations, it is necessary to adjust the gain applied to the frequency control signal to compensate for such significant changes in laser output intensity and gain, to avoid either excess loop gain and consequent undesired oscillation or decreased loop gain and, therefore, excessive frequency error. Such gain correction is especially necessary with a dye laser, in which the output intensity level may vary over as much as a 100:1 range as the output of the laser is tuned over its normal wavelength tuning range of 400 nm to 800 nm. While this gain adjustment may be done manually, by adjusting a potentiometer, the tedious nature and frequent requirement of such adjustments for a broadband scanning laser make such manual adjustment very inconvenient. For such a laser system some automatic means is especially desirable for adjusting and stabilizing the overall loop gain applied to the frequency control feedback signal to eliminate the variations in the actual frequency error of the signal caused by variations in the laser output intensity so that a high, relatively constant loop gain and loop bandwidth can be maintained for both frequency stabilization and microphonics rejection over an output intensity level variation range of 100:1.

In FIG. 1 the automatic gain adjustment structure comprises essentially the functional components enclosed within the labeled broken line perimeter. It may be seen that the intensity proportional signal from detector 14 which is fed to amplifier 20 is also fed to amplifier 25, which has the same amplification characteristics as amplifier 20. Since the output signal level or intensity is inherently related to the gain of the laser, the signal from detector 14 thus represents an analog signal corresponding to the gain of laser 2. From there the amplified signal, denoted $E_2$, is fed into a multiplier 26 which forms part of an internal gain stabilization feedback control loop and where the signal $E_2$ is combined by multiplying with an internal loop feedback signal $E_G$ to provide a combined signal $E_3$ equal to $E_2 \times E_G$, which the loop functions to maintain constant. The combined signal, $E_3$, is then fed to differential amplifier 28 where it is compared with another reference signal corresponding to a predetermined desired laser output intensity (i.e., laser gain) from intensity reference 30. Any difference between the combined signal $E_3$ and the predetermined intensity reference signal is expressed as a gain error signal $E_4$ and is applied to variable intensity light emitter 32. The intensity of light emitted by emitter 32 is directly proportional to the magnitude of the error signal $E_4$. The light from emitter 32 illuminates photoresistor 34 whose resistance is inversely proportional to light incident upon it. This resistor 34 has one end connected to ground and comprises the low resistance leg of a voltage dividing network which also includes fixed resistance 36 and potential source 38. Since the intensity of the light emitted by emitter 32 is directly proportional to the gain error signal $E_4$, and the resistance of photo-resistor 34 is inversely proportional to the light received from emitter 32, an internal loop feedback signal $E_G$, which is inversely proportional to the gain error signal, may thus be supplied by the voltage dividing network to intensity signal multiplier 26 for application to input signal $E_2$. Thus, the combined signal $E_3$ from signal multiplier 26 tends to be driven toward the predetermined intensity reference signal with the combination of the light emitter 32 and photoresistor 34 providing for generation of the necessary feedback signal.

Preferably, the light emitter 32/photocell 34 combination may comprise half of a dual resistor, optically coupled control 40, such as a Vactec VTL5C, in which two substantially identical photoresistors are optically coupled to a single light emitter. The other photoresistor 42 of this dual photoresistor device 40 may then be made the low resistance leg of a voltage divider including resistor R22, for controlling the frequency error signal provided to amplifier 24. Thus, any change effected in photoresistor 34 to stabilize the gain in the gain stabilization loop will also be effected either identically or proportionally through photoresistor 42 to adjust the loop gain or attenuation applied to the frequency error signal $E_f$ which is provided through resistor 22 to amplifier 24. Thus, by the selective, compensating attenuation determined by the internal control loop, the total loop gain and bandwidth of the laser frequency control loop may be maintained constant regardless of changes in the gain and output intensity of the laser, simply by substituting the feedback control signal determined by the internal gain stabilization loop into the frequency control loop as a gain or attenuation signal.

By means of this circuitry a feedback control signal $E_{ft}$ which is a function of frequency error parameters only is provided to the laser frequency control element driving amplifier 24 despite the fact that the basic feedback control signal $E_f$ is, in reality, a product of both frequency and intensity (and thus laser gain) parameters.

Figure 3:
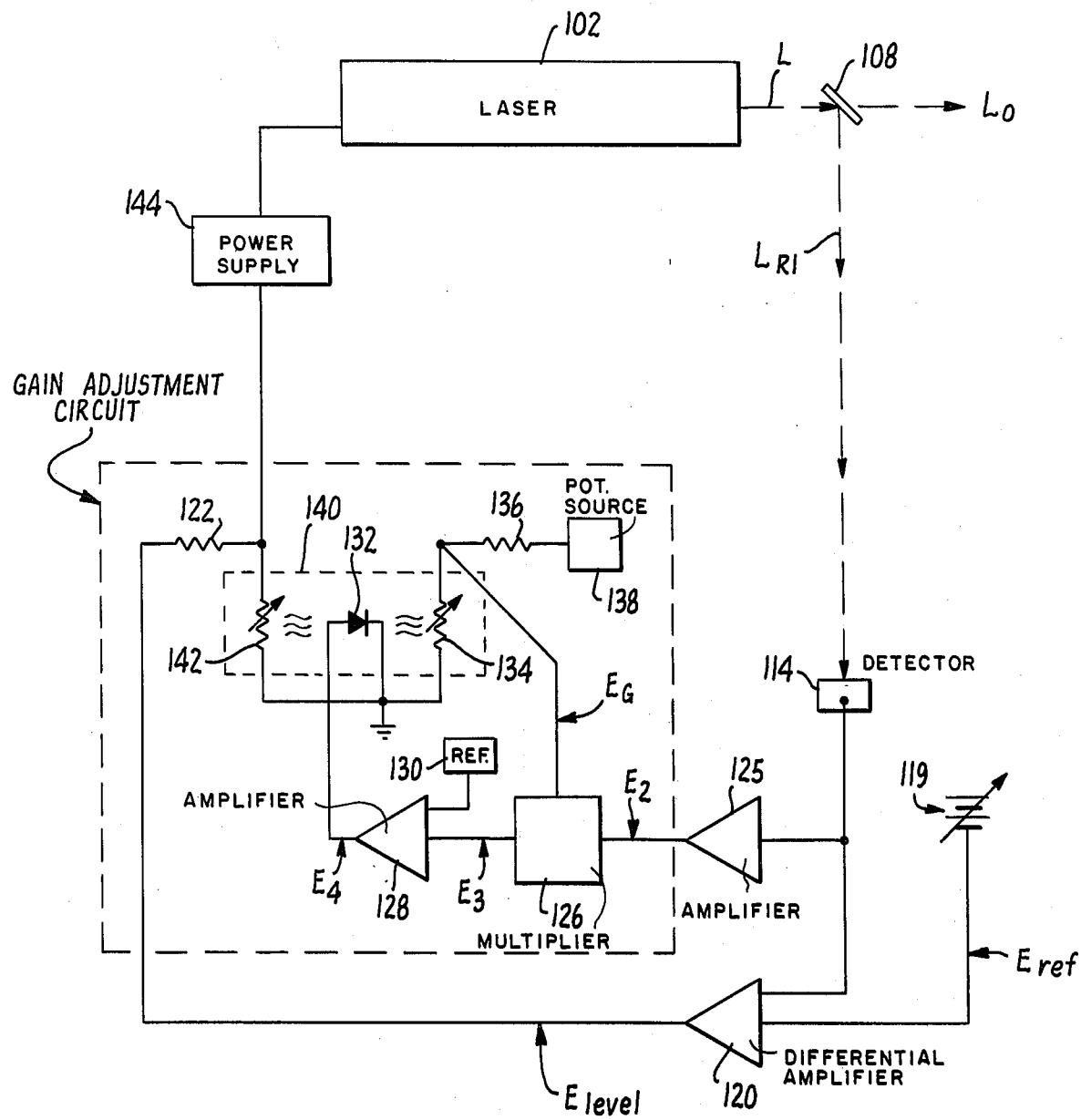
FIG. 3 is a functional block diagram in simplified schematic form of a laser system incorporating the feedback loop control system of this invention for stabilizing the level of output radiation.

A second illustrative embodiment of the method and apparatus of this invention is illustrated in FIG. 3, as a control system for maintaining constant at a predetermined level the output intensity of a laser, such as the argon laser used to pump the dye laser of the previous embodiment. The control loop of this embodiment is substantially similar to that of the embodiment of FIG. 1 and accordingly, all similar elements are denoted with corresponding reference numbers increased by 100 (e.g., detector 14 of FIG. 1 is denoted detector 114 in FIG. 3).

In this embodiment, the dye laser 2 is replaced by any conventional laser, such as an argon laser 102. Also, in this embodiment the function of the laser control system is to control the level of the output radiation of the laser 102 at selectively different preselected levels, where frequency variation is not a problem. Accordingly, the resonant reference cavity is replaced by a variable intensity control 119, which conveniently may be an adjustable source of direct current potential providing a reference signal $E_{ref}$ to differential amplifier 120. By comparing this reference signal $E_{ref}$ with the output signal from detector 114, any corrections needed to bring the level of output radiation from laser 102 into correspondence with the predetermined reference 119 may be generated. This correction signal $E_{level}$ may then have applied to it the appropriate gain or attenuation necessary to compensate for gain variations in the laser 102, all as described with regard to the embodiment of FIG. 1. This level correction signal, $E_{level}$, suitably attenuated, may then be applied to a power supply 144 for adjusting the current input to the laser 102, which necessarily effects an adjustment in the level of output radiation of that laser. This arrangement not only stabilizes the level of output radiation of the laser at the predetermined level but also enhances the rejection of noise in the signal being applied to power supply 144. This enhanced control loop noise rejection is desirable because the noise of the laser output signal L inherently increases as the laser intensity (and thus the laser gain) is reduced, thus tending to provide an increasingly noisy signal to the differential amplifier 120 where the feedback control signal is generated. By the enhanced noise rejection provided by the gain adjustment circuit, the signal applied to power supply 144 is thus compensated for any changes in the gain, and thus the noise rejection, of the laser 102.

Figure 4:
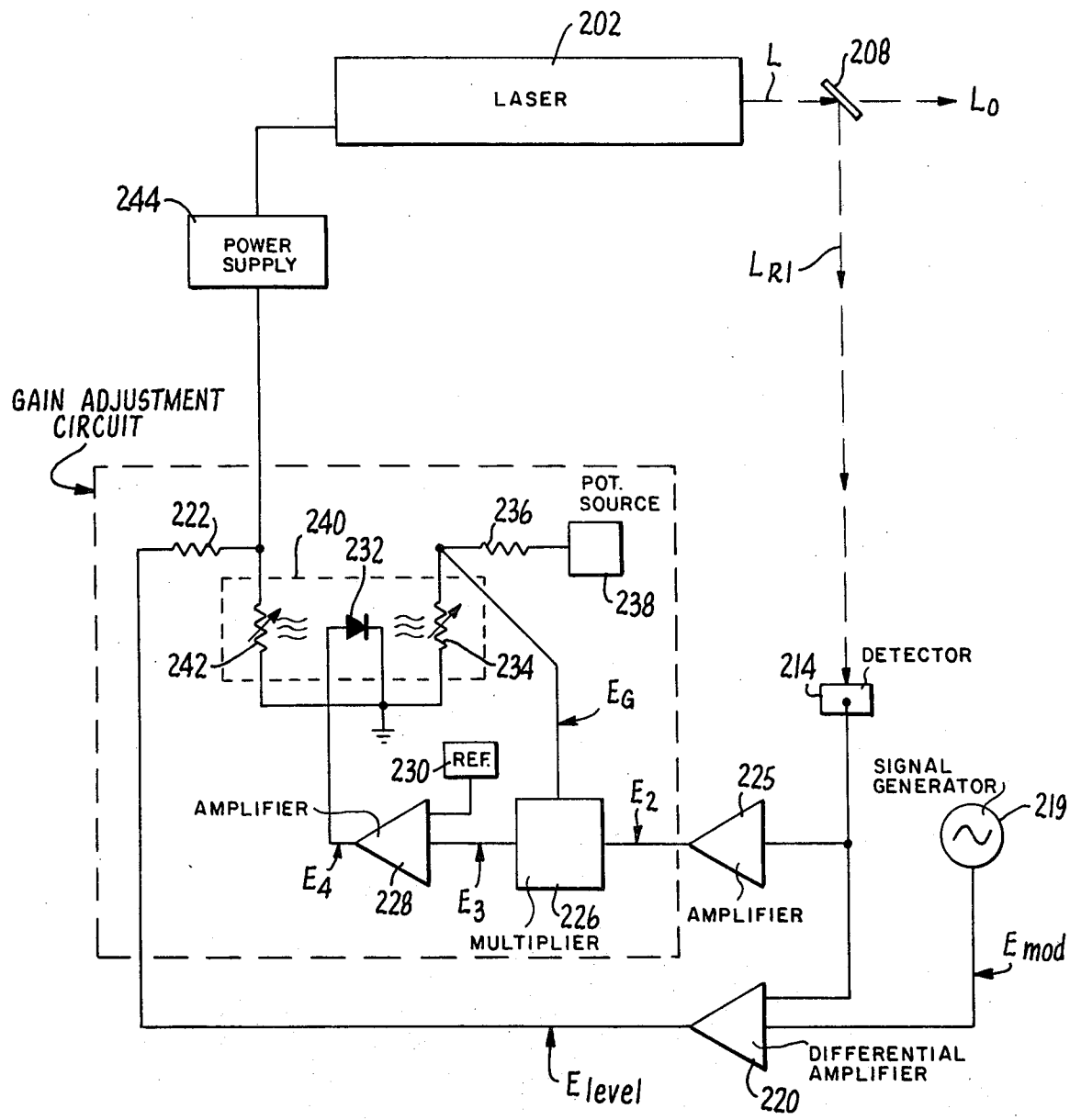
FIG. 4 is a functional block diagram in simplified schematic form of a laser system incorporating the feedback loop control system of this invention for modulating the intensity of the output radiation of that laser.

A third illustrative embodiment of the method and apparatus of this invention is shown in FIG. 4, which is substantially similar to the embodiment of FIG. 3 with the substitution of a modulated control signal generator 219 for the adjustable DC signal generator 119 of the embodiment of FIG. 3. By this substitution a control signal may be applied for modulating the level of output radiation L from the controlled element, which again may be a laser, either sinusoidally or in any other convenient manner. In this embodiment, the signal generated by the modulated reference 219 is denoted as $E_{mod}$. For ease of comparison with the embodiment of FIG. 3 the elements in FIG. 4 corresponding to the elements in FIG. 3 having a 100-series prefix are denoted with corresponding numbers having a 200-series prefix.

Through the use of the apparatus illustrated in FIG. 4, the level of the output of laser 202 may be modulated by control 219 in any desired manner, with the gain adjustment circuit stabilizing the gain and bandwidth of the feedback control circuit to provide for a high fidelity correspondence between the output L (and $L_o$) of the laser and that commanded by the control 219, despite variations in the laser gain caused by such level modulation.

The foregoing description of illustrative embodiments of the apparatus and method of this invention is intended to be illustrative only of the principles of the invention and not to be limitative thereof, especially in view of the applicability of the invention to numerous types of control systems unrelated to lasers. Accordingly, since numerous variations of the apparatus and method of this invention, within the scope of the invention, will readily become apparent to those skilled in the art, the scope of this invention is to be limited, not by the foregoing description but, solely by the claims appended hereto.

What is claimed is:

1. A feedback loop control system for controlling an element which has a variable gain and which produces an output signal proportional to said element gain, comprising means for generating a feedback signal corresponding to the difference between a desired value of an element operating parameter and the actual value of said operating parameter in said element output signal, and means for compensating said feedback signal for variations in said element gain by applying to said feedback signal a corresponding signal which varies inversely with said element gain variations, whereby the total loop gain and bandwidth of the element control loop may be stabilized despite variations in the gain of the controlled element.

2. A feedback control system according to claim 1 further comprising means for generating an analog signal corresponding to said element gain, another feedback control loop internal to said element control loop, said internal control loop receiving said gain analog signal and applying a feedback control signal thereto to stabilize said internal control loop, and means for generating an attenuating signal proportional to said internal control loop feedback signal for application to said element control signal as said compensating signal, whereby stabilization of said internal control loop may serve to stabilize the total loop gain and bandwidth of the element control loop.

3. A feedback control system according to claim 2 wherein said internal control loop comprises means for applying said internal control loop feedback signal to said gain analog signal to provide a combined signal corresponding to the combination of said element gain analog signal and said internal loop feedback signal, means for providing a reference signal corresponding to a predetermined element gain, means for generating a gain error signal corresponding to the difference between said combined signal and said reference signal, and means for generating an internal control loop feedback signal inversely proportional to said gain error signal and for supplying said internal control loop feedback signal to said internal control loop feedback signal applying means for application to said gain analog signal, whereby the combined signal may be driven toward the reference signal.

4. A feedback control system according to claim 3 wherein said internal control loop feedback signal generating means comprises a voltage dividing network including a fixed resistance leg connected to a source of electrical potential, a variable resistance leg connected to ground and means for varying the resistance of said variable resistance leg inversely with said gain error signal.

5. A feedback control system according to claim 4 wherein said resistance varying means comprises a variable intensity light emitter having said gain error signal applied thereto such that variations in the intensity of the light emitted thereby are directly proportional to variations in said gain error signal, and wherein said variable resistance leg comprises a photoresistor receiving said emitter light and having a resistance varying inversely with the intensity of said emitter so received, whereby the resistance of said photoresistor may vary inversely with variations in the gain error signal.

6. A feedback loop control system according to claim 1 wherein said controlled element is a laser.

7. A feedback loop control system according to claim 6 wherein said controlled element is a variable frequency laser and wherein said laser operating parameter is the frequency of the laser output radiation.

8. A feedback loop control system according to claim 6 wherein said laser operating parameter is the level of output radiation, whereby may be stabilized both the output radiation level and the element control loop noise rejection.

9. A feedback loop control system according to claim 6 wherein said controlled element is a laser having its level of output radiation selectively variable in response to a modulation input, whereby the gain of the laser may be stabilized despite the selective variations in the level of the laser output radiation.

10. A method of controlling the operation of an element which has a variable gain and which produces an output signal corresponding proportional to said element gain, comprising generating a feedback control signal corresponding to the difference between a desired value of an element operating parameter and the actual value of said operating parameter in said element output signal, and compensating said feedback signal for variations in said element gain by applying to said feedback control signal a corresponding signal which varies inversely with said element gain variations, whereby the total loop gain and bandwidth of the element feedback control loop may be stabilized despite variations in the gain of the controlled element.

11. The method of claim 10 wherein said compensating signal is obtained by generating an analog signal corresponding to said element gain, applying said gain analog signal to a second feedback control loop internal to said element control loop, generating an internal control loop feedback signal for combination with said analog signal such that the combination of said analog signal and said internal control loop feedback signal may be maintained at a predetermined value, and generating an attenuating signal proportional to said internal control loop feedback signal for application to said element feedback control signal as said compensating signal, whereby stabilization of said internal control loop may serve to stabilize the total loop gain and bandwidth of the element control loop.

* * * * *